United States Patent
Komatsubara (10) Patent No.: US 10,819,180 B2
(45) Date of Patent: Oct. 27, 2020

(54) FLUID DYNAMIC BEARING DEVICE AND MOTOR WITH SAME

(71) Applicant: NTN CORPORATION, Osaka (JP)

(72) Inventor: Shinji Komatsubara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/314,771

(22) PCT Filed: Jun. 14, 2017

(86) PCT No.: PCT/JP2017/021960
§ 371 (c)(1),
(2) Date: Jan. 2, 2019

(87) PCT Pub. No.: WO2018/012186
PCT Pub. Date: Jan. 18, 2018

(65) Prior Publication Data
US 2019/0245408 A1    Aug. 8, 2019

(30) Foreign Application Priority Data

Jul. 14, 2016 (JP) ................................. 2016-139305
Mar. 1, 2017 (JP) ................................. 2017-038309

(51) Int. Cl.
*H02K 5/16* (2006.01)
*H02K 5/167* (2006.01)
(Continued)

(52) U.S. Cl.
CPC .............. *H02K 5/167* (2013.01); *F16C 17/02* (2013.01); *F16C 17/026* (2013.01);
(Continued)

(58) Field of Classification Search
CPC .......... H02K 5/167; H02K 7/08; F16C 17/02; F16C 17/026; F16C 17/107; F16C 33/02;
(Continued)

(56) References Cited

U.S. PATENT DOCUMENTS

| | | | |
|---|---|---|---|
| 8,926,183 B2 * | 1/2015 | Noda | F16C 17/026 |
| | | | 384/107 |
| 2005/0225187 A1 * | 10/2005 | Hafen | F16C 17/102 |
| | | | 310/90 |

(Continued)

FOREIGN PATENT DOCUMENTS

| | | |
|---|---|---|
| CN | 103339393 | 10/2013 |
| CN | 105090090 | 11/2015 |

(Continued)

OTHER PUBLICATIONS

Chinese Office Action dated Dec. 25, 2019 in corresponding Chinese Patent Application No. 201710572667.2 with English translation of Search Report.

(Continued)

*Primary Examiner* — Tulsidas C Patel
*Assistant Examiner* — Rashad H Johnson
(74) *Attorney, Agent, or Firm* — Wenderoth, Lind & Ponack, L.L.P.

(57) ABSTRACT

A charging amount of lubricating oil (11) into an internal space of a housing (7) is adjusted so that, within a range of a use temperature, an oil level of the lubricating oil (11) is positioned on a lower side with respect to an upper end portion of a chamfered portion (8*f*) formed in an upper-end inner peripheral edge portion of a bearing member (8). The bearing member (8) integrally includes: a small-diameter cylindrical portion (81); and a large-diameter cylindrical portion (82). Under a state in which an upper end surface (8*c*) of the small-diameter cylindrical portion (81) is exposed to an atmosphere, the large-diameter cylindrical portion (82) is sandwiched from both sides in the axial direction with an annular member (9) and a bottom portion (7*b*) of the housing (7) so that the bearing member (8) is fixed along an inner periphery of the housing (7).

11 Claims, 8 Drawing Sheets

(51) Int. Cl.
*F16C 35/02* (2006.01)
*H02K 7/08* (2006.01)
*F16C 17/02* (2006.01)
*F16C 33/14* (2006.01)
*F16C 33/10* (2006.01)
*F16C 33/12* (2006.01)
*F16C 17/10* (2006.01)
*F16C 33/74* (2006.01)

(52) U.S. Cl.
CPC .......... *F16C 33/103* (2013.01); *F16C 33/104* (2013.01); *F16C 33/106* (2013.01); *F16C 33/107* (2013.01); *F16C 33/128* (2013.01); *F16C 33/145* (2013.01); *F16C 35/02* (2013.01); *H02K 7/08* (2013.01); *F16C 17/107* (2013.01); *F16C 33/745* (2013.01); *F16C 2370/12* (2013.01)

(58) Field of Classification Search
CPC .... F16C 33/103; F16C 33/104; F16C 33/106; F16C 33/107; F16C 33/128; F16C 33/145; F16C 33/745; F16C 35/02; F16C 2370/12
USPC .................................................. 310/90, 90.5
See application file for complete search history.

(56) References Cited

U.S. PATENT DOCUMENTS

| | | | |
|---|---|---|---|
| 2007/0044312 A1 | 3/2007 | Hirata et al. | |
| 2007/0104400 A1* | 5/2007 | Ito | F16C 17/107 384/107 |
| 2007/0140606 A1* | 6/2007 | Feng | F16C 17/026 384/107 |
| 2010/0310199 A1* | 12/2010 | Okamura | B22F 3/164 384/114 |
| 2010/0315742 A1* | 12/2010 | Kimura | F16C 17/10 360/224 |
| 2013/0194701 A1* | 8/2013 | Fukushima | H02K 5/1675 360/99.08 |
| 2013/0272634 A1 | 10/2013 | Kokumai et al. | |
| 2015/0233417 A1 | 8/2015 | Komatsubara et al. | |
| 2015/0323011 A1 | 11/2015 | Lu et al. | |
| 2019/0245408 A1 | 8/2019 | Komatsubara | |

FOREIGN PATENT DOCUMENTS

| | | |
|---|---|---|
| CN | 206988281 | 2/2018 |
| JP | 2003-307212 | 10/2003 |
| JP | 2007-64240 | 3/2007 |
| JP | 2014-59014 | 4/2014 |

OTHER PUBLICATIONS

International Search Report dated Aug. 29, 2017 in International (PCT) Application No. PCT/JP2017/021960.

International Preliminary Report on Patentability dated Jan. 15, 2019 in International (PCT) Application No. PCT/JP2017/021960.

* cited by examiner

FLUID DYNAMIC BEARING DEVICE AND MOTOR WITH SAME

TECHNICAL FIELD

The present invention relates to a fluid dynamic bearing device and a motor including the same.

BACKGROUND ART

As is well known, a fluid dynamic bearing device has advantageous features such as high-speed rotation, high rotation accuracy, and low noise. Therefore, the fluid dynamic bearing device is suitably used as a bearing device for motors to be mounted to various types of electric equipment, such as a spindle motor to be incorporated into a disc drive device such as an HDD, a fan motor to be incorporated into a PC, or a polygon scanner motor to be incorporated into a laser beam printer.

For example, in Patent Literature 1 described below, there is disclosed a fluid dynamic bearing device including: a bearing member which is arranged along an inner periphery of a housing having a bottomed cylindrical shape; a radial bearing portion, which is configured to support the shaft member in a radial direction with an oil film of lubricating oil formed in a radial gap defined between an outer peripheral surface of a shaft to be supported (shaft member to be inserted along an inner periphery of the bearing member) and an inner peripheral surface of the bearing member; a thrust bearing portion, which is configured to support the shaft member in one thrust direction; and a seal member, which has an annular shape, and is arranged along an inner periphery at an opening portion of the housing.

The fluid dynamic bearing device of Patent Literature 1 is used in so-called "full-fill state" in which an entirety of an inner space of the housing is filled with the lubricating oil. Between the inner peripheral surface of the seal member and the outer peripheral surface of the shaft member which are opposed to each other, there is defined a seal space for maintaining an oil level of the lubricating oil in order to prevent, for example, leakage of the lubricating oil to the outside as much as possible. The fluid dynamic bearing employing such full-fill structure has an advantage in that high bearing performance may be exerted. However, it is required that, after assembly of the device, the entirety of the inner space of the housing (including internal pores of the bearing member when the bearing member is formed of a porous body such as sintered metal) be filled with lubricating oil using a complicated method such as so-called vacuum impregnation, and that an oil level position of the lubricating oil be finely adjusted. In relation to such circumstance, there is a problem in that it is difficult to reduce the manufacturing cost.

In order to deal with such problem, for example, in Patent Literature 2 described below, there has been proposed a fluid dynamic bearing device employing so-called "partial-fill structure" in which lubricating oil is partially interposed in an internal space of a housing (air and lubricating oil are provided in a mixed state in the internal space of the housing). The partial-fill structure has a basic structure for allowing the lubricating oil in the internal space of the housing by the amount which is sufficient for filling a radial bearing gap of the radial bearing portion and a peripheral region of the thrust bearing portion during operation of the bearing device. Therefore, it is not required to employ a complicated method such as vacuum impregnation for charging of the lubricating oil. Further, it is also not required to highly accurately manage the charging amount of the lubricating oil. Therefore, the charging operation for the lubricating oil can be simplified, and there is an advantage in that manufacturing cost for the fluid dynamic bearing can be reduced through the simplification of the charging operation.

Moreover, in Patent Literature 2, for example, for the purpose of further reducing manufacturing cost, there has also been proposed a method of fixing the bearing member along the inner periphery of the housing by sandwiching the bearing member from both sides in the axial direction with an annular member and a bottom portion of the housing.

CITATION LIST

Patent Literature 1: JP 2003-307212 A
Patent Literature 2: JP 2014-59014 A

SUMMARY OF INVENTION

Technical Problem

Incidentally, in recent years, there has been an increasing demand for an ultra-thin and light-weight notebook PC as represented by ULTRABOOK (trademark). A casing of the notebook PC of such type has a small thickness. Therefore, as a matter of course, it is required that a fan motor to be mounted to the notebook PC be also reduced in thickness. Meanwhile, even a fan motor to be mounted to the ultra-thin notebook PC is required to maintain at least cooling performance equivalent to that of the related art, and in some cases, it is required that the cooling performance be improved. In order to meet such demand, it is required that a rotor including a fan (vanes) for sending air, which is to be mounted to the shaft member, be increased in size. However, as the rotor is increased in size, a radial load (load to be supported by the radial bearing portion) acting on the bearing device during rotation of the rotary body increases.

As one of measures for improving a capability to bear the radial load (bearing stiffness), it is conceivable to increase an axial dimension of the bearing member which is directly involved in formation of the radial bearing gap. However, when such a measure is taken, it becomes difficult to reduce a thickness of the entirety of the device.

In view of the actual circumstances described above, an object of the present invention is to provide, at low cost, a fluid dynamic bearing device which is excellent in capability to bear a radial load (bearing stiffness of a radial bearing portion) while being compact in an axial direction.

Solution to Problem

In order to achieve the above-mentioned object, according to one embodiment of the present invention, there is provided an fluid dynamic bearing device, comprising: a housing having a bottomed cylindrical shape with an end portion on one end side in an axial direction being opened and an end portion on another end side in the axial direction being closed, a bearing member, which is arranged along an inner periphery of the housing, and has a chamfered portion at an inner peripheral edge portion on one end side in the axial direction, the bearing member being porous; and a radial bearing portion, which is configured to support the shaft member in a radial direction with an oil film of lubricating oil formed in a radial bearing gap defined between an inner peripheral surface of the bearing member and an outer peripheral surface of the shaft member to be inserted along an inner periphery of the bearing member, wherein the shaft member is supported in a thrust direction by an inner bottom surface of the housing, wherein a charging amount of the lubricating oil into an internal space of the housing is adjusted so that, within a range of a use temperature, an oil level of the lubricating oil is positioned on another end side in the axial direction with respect to the end portion of the chamfered portion on one end side in the axial direction, wherein the bearing member integrally comprises: a small-diameter cylindrical portion, which is arranged on one end side in the axial direction, and has a relatively smaller outer diameter dimension; and a large-diameter cylindrical portion, which is arranged on another end side in the axial direction, and has a relatively larger outer diameter dimension, and wherein, under a state in which an end surface of the small-diameter cylindrical portion on one end side in the axial direction is exposed to an atmosphere, the large-diameter cylindrical portion of the bearing member is sandwiched from both sides in the axial direction between an annular member, which is arranged between the small-diameter cylindrical portion and a tubular portion of the housing, and a bottom portion of the housing so that the bearing member is fixed along an inner periphery of the housing.

The feature that the shaft member is supported in the thrust direction by the inner bottom surface of the housing encompasses both of a case in which the shaft member is supported in the thrust direction in a contact state and a case in which the shaft member is supported in the thrust direction in a non-contact state. Moreover, the internal space of the housing encompasses not only a gap (space) defined by two opposed surfaces of component members (housing, bearing member, annular member, and shaft member) of the fluid dynamic bearing device but also internal pores of the porous bearing member.

The configuration of the present invention described above corresponds to a configuration of the fluid dynamic bearing device disclosed in Patent Literatures 1 and 2 except that an annular seal member is omitted, which is arranged along an inner periphery of an end portion on one end side in the axial direction of the housing (opening side) and defines a seal space for maintaining the oil level of the lubricating oil with the outer peripheral surface of the shaft member. Therefore, even without changing the axial dimension of the bearing member and the bearing stiffness of the radial bearing portion, the axial dimension of the housing can be reduced at least by the axial dimension of the seal member, thereby being capable of reducing the size of the entire device. Moreover, the bearing member integrally comprises a small-diameter cylindrical portion and a large-diameter cylindrical portion, which have outer diameter dimensions different from each other. The large-diameter cylindrical portion is sandwiched from both sides in the axial direction between an annular member, which is arranged between the small-diameter cylindrical portion and a tubular portion of the housing, and a bottom portion of the housing so that the bearing member is fixed along the inner periphery of the housing. Therefore, an assembly step can be simplified, thereby being capable of reducing manufacturing cost of the fluid dynamic bearing device.

It is preferred that fitting of the large-diameter cylindrical portion with respect to the tubular portion of the housing and fitting of the small-diameter cylindrical portion with respect to the annular member each comprise loose fitting. With this, degradation in gap width accuracy of the radial bearing gap caused by deformation of the inner peripheral surface of the bearing member and degradation in bearing performance of the radial bearing portion, which are concerned when loose fitting is employed as fitting of the large-diameter cylindrical portion with respect to the tubular portion of the housing and fitting of the small-diameter cylindrical portion with respect to the annular member, can be prevented as much as possible. The definition of the term "loose fitting" conforms to Japan Industrial Standard JIS B 0401-1.

The porous bearing member may be formed of a porous body made of sintered metal. In this case, when the inner peripheral surface of the bearing member comprises a molded surface which is molded in conformity with an outer peripheral surface of a sizing core, the inner peripheral surface of the bearing member can be finished with a predetermined shape and accuracy at low cost. However, in view of the configuration of the present invention in which the bearing member is formed into a stepped cylindrical shape integrally comprising the small-diameter cylindrical portion and the large-diameter cylindrical portion, when a difference in radial thickness between the cylindrical portions is excessively large, after sizing is performed on a sintered body (bearing material made of sintered metal), a large difference in compression amount in the radial direction and spring back amount after release of a compression force is liable to occur between the cylindrical portions. As a result, there is a fear in that the inner peripheral surface of the bearing member cannot be finished with a predetermined shape and accuracy. Therefore, it is preferred that a limit be given to the difference in radial thickness between the both cylindrical portions. Specifically, it is preferred that a ratio ($t2/t1$) of a radial thickness ($t2$) of the large-diameter cylindrical portion to a radial thickness ($t1$) of the small-diameter cylindrical portion be less than 2.5, more preferably, equal to or less than 2. The thicknesses ($t1$ and $t2$) described above correspond to minimum values.

A tapered surface which is gradually reduced in diameter from another end side in the axial direction (bottom portion side of the housing) toward one end side in the axial direction (opening side of the housing) may be formed in the outer peripheral surface of the small-diameter cylindrical portion. With such configuration, when the bearing member (bearing material) is to be introduced into a die of a sizing die (further, when the bearing member is to be separated from the sizing die), the fear of causing defects such as flaws and scuffs on the outer peripheral surface of the small-diameter cylindrical portion of the bearing member can be reduced as much as possible. The outer peripheral surface of the small-diameter cylindrical portion of the bearing member may be formed of the tapered surface described above in its entire region or may be formed of a cylindrical surface having a constant diameter and the tapered surface described above. When the configuration of the latter is employed, the cylindrical surface may be formed between the tapered surface and an end surface of the small-diameter cylindrical portion on one end side in the axial direction.

A dynamic pressure generating portion configured to generate fluid dynamic pressure in the lubricating oil in the radial bearing gap may be formed in the inner peripheral surface of the bearing member. With such configuration, the radial bearing portion may be formed of a fluid dynamic bearing, thereby being capable of further improving the bearing stiffness of the radial bearing portion.

The shaft member is insertable and removable with respect to the bearing member. In this case, the shaft member can be inserted into the bearing member at a freely selected timing. Therefore, for example, when the shaft member is inserted into the bearing member charged with a predetermined amount of lubricating oil along an inner periphery, along with the insertion of the shaft member, the lubricating oil can be spread to a radial gap (radial bearing gap) between the inner peripheral surface of the bearing member and the outer peripheral surface of the shaft member and to the peripheral region of the thrust bearing portion.

An external force for urging the shaft member toward another end side in the axial direction may be caused to act on the shaft member. When the configuration described above is employed in a case in which the shaft member is insertable and removable with respect to the bearing member, it is advantageous for preventing unintended removal of the shaft member as much as possible. The external force may be, for example, magnetic force. This magnetic force can be given, for example, by arranging a stator coil provided on a stationary side of a motor and a rotor magnet provided on a rotary side of the motor so as to be apart from each other in the axial direction. A motor into which the fluid dynamic bearing device of this type is incorporated generally includes a rotor magnet and a stator coil as essentially required component members. Therefore, there is no increase in cost for causing the external force to act on the shaft member.

The fluid dynamic bearing device according to the embodiment of the present invention described above may be suitably used by being incorporated into various motors such a fan motor for a PC and a polygon scanner motor for a laser beam printer (LBP). Moreover, a rotor including vanes for sending air to a shaft member is provided to a fluid dynamic bearing device to be incorporated into a fan motor, and a polygon scanner, which is provided to a shaft, is provided to a fluid dynamic bearing device to be incorporated into a polygon scanner motor.

Advantageous Effects of Invention

As described above, according to one embodiment of the present invention, it is possible to provide, at low cost, a fluid dynamic bearing device which is excellent in capability to bear a radial load (bearing stiffness of a radial bearing portion) while being compact in an axial direction.

DESCRIPTION OF EMBODIMENTS

Now, embodiments of the present invention are described with reference to the drawings.

Figure 1:
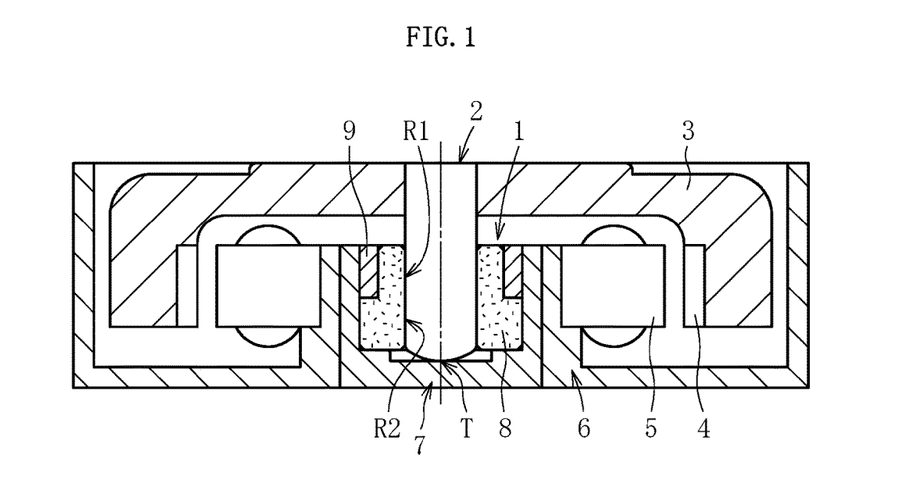
FIG. 1 is a sectional view for schematically illustrating a configuration example of a fan motor.

FIG. 1 is a schematic view for illustrating a configuration example of a fan motor. The fan motor illustrated in FIG. 1 comprises a fluid dynamic bearing device 1, a motor base 6, a stator coil 5, a rotor 3, and a rotor magnet 4. The motor base 6 forms a stationary side of the motor. The stator coil 5 is mounted to the motor base 6. The rotor 3 comprises vanes (not shown) for sending air, and forms a rotary side of the motor. The rotor magnet 4 is mounted to the rotor 3, and is opposed to the stator coil 5 with a radial gap. A housing 7 of the fluid dynamic bearing device 1 is fixed along an inner periphery of the motor base 6, and the rotor 3 is mounted to one end of a shaft member 2 of the fluid dynamic bearing device 1. In the fan motor having such configuration, when the stator coil 5 is energized, an electromagnetic force generated between the stator coil 5 and the rotor magnet 4 causes the rotor magnet 4 to rotate. The rotation of the rotor magnet 4 causes the shaft member 2 and the rotor 3 mounted to the shaft member 2 to integrally rotate.

When the rotor 3 rotates, air is sent upward or downward in FIG. 1 in accordance with a mode of the vanes provided to the rotor 3. Therefore, during the rotation of the rotor 3, a thrust force in a downward or upward direction in FIG. 1 acts on the shaft member 2 of the fluid dynamic bearing device 1 as a reaction force against the air-sending action. A magnetic force (repulsive force) in a direction of cancelling out the thrust force is caused to act between the stator coil 5 and the rotor magnet 4, and a thrust load which is generated by a difference in magnitude between the thrust force and the magnetic force is supported by a thrust bearing portion T of the fluid dynamic bearing device 1. The magnetic force in the direction of cancelling out the thrust force can be generated, for example, by arranging the stator coil 5 and the rotor magnet 4 so as to be apart from each other in the axial direction (detailed illustration is omitted). Moreover, during the rotation of the rotor 3, the radial load acts on a bearing member 8 of the fluid dynamic bearing device 1. This radial load is supported by radial bearing portions R1 and R2 of the fluid dynamic bearing device 1.

Figure 2:
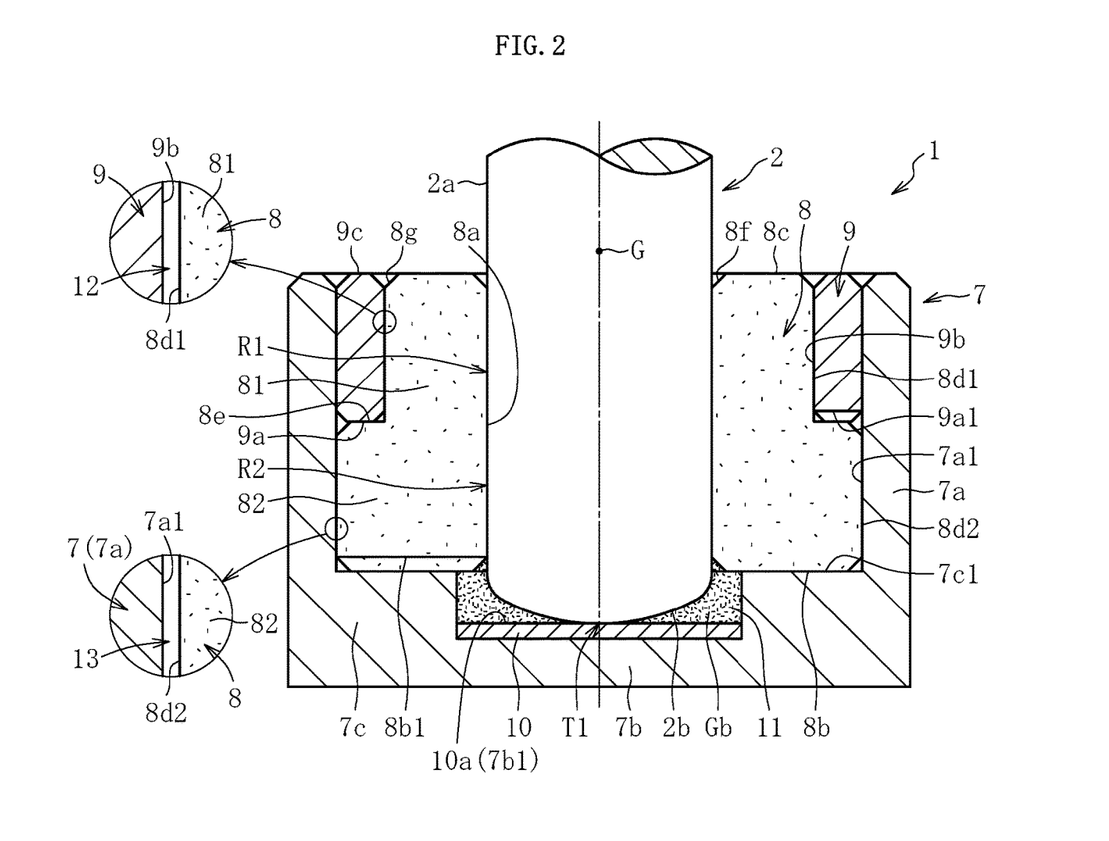
FIG. 2 is a sectional view for illustrating a fluid dynamic bearing device according to an embodiment of the present invention.

FIG. 2 is an illustration of the fluid dynamic bearing device 1 according to one embodiment of the present invention. The fluid dynamic bearing device 1 comprises the shaft member 2, the bearing member 8, an annular member 9, and the housing 7 having a bottomed cylindrical shape. An internal space of the housing 7 is charged with lubricating oil 11 (illustrated with dense dispersed-point hatching). In the following, for convenience of description, a side on which the annular member 9 is arranged is referred to as an upper side, and a side opposite thereto in the axial direction is referred to as a lower side. However, the definitions of the sides do not limit a usage mode of the fluid dynamic bearing device 1.

The housing 7 comprises a tubular portion 7a and a bottom portion 7b to form a bottomed cylindrical shape. The tubular portion 7a has a cylindrical shape. The bottom portion 7b closes a lower end opening of the tubular portion 7a. In this case, the tubular portion 7a and the bottom portion 7b are integrally formed of a metal material such as brass. A step portion 7c having an annular shape is formed on an inner periphery of a boundary portion between the tubular portion 7a and the bottom portion 7b, and is formed integrally with the tubular portion 7a and the bottom portion 7b. In this embodiment, a thrust plate 10 made of resin is placed on the bottom portion 7b of the housing 7, and an inner bottom surface 7b1 of the housing 7 is formed with an upper end surface 10a of the thrust plate 10. However, the thrust plate 10 is not always required to be provided, and may be omitted.

The shaft member 2 is made of a metal material having a high stiffness, as represented by stainless steel. An outer peripheral surface 2a of the shaft member 2 is formed into a cylindrical surface having constant diameter without recesses and protrusions. An outer diameter dimension of the shaft member 2 is smaller than an inner diameter dimension of the bearing member 8. Thus, the shaft member 2 is insertable and removable with respect to the bearing member 8. A lower end surface 2b of the shaft member 2 is formed into a convex surface, and is held in contact with the upper end surface 10a of the thrust plate 10.

The bearing member 8 integrally comprises a small-diameter cylindrical portion 81 and a large-diameter cylindrical portion 82 to form a stepped cylindrical shape. The small-diameter cylindrical portion 81 is arranged on the upper side, and comprises an outer peripheral surface 8d1 having a relatively smaller diameter. The large-diameter cylindrical portion 82 is arranged on the lower side, and comprises an outer peripheral surface 8d2 having a relatively larger diameter. The outer peripheral surface 8d1 of the small-diameter cylindrical portion 81 and the outer peripheral surface 8d2 of the large-diameter cylindrical portion 82 in this embodiment are each formed into a cylindrical surface having a constant diameter. Chamfered portions 8f and 8g are formed in an upper-end inner peripheral edge portion and an upper-end outer peripheral edge portion of the bearing member 8 (small-diameter cylindrical portion 81), respectively. In a lower end surface 8b of the bearing member 8 (large-diameter cylindrical portion 82), one or a plurality of radial grooves 8b1 are formed so as to be open to chamfered portions formed in a lower-end inner peripheral edge portion and a lower-end outer peripheral edge portion of the bearing member 8. The bearing member 8 having the configuration described above has an upper end surface (upper end surface of the small-diameter cylindrical portion 81) 8c exposed to an atmosphere, and is fixed along the inner periphery of the housing 7 under a state in which a lower end surface 8b is held in abutment against an upper end surface 7c1 of the step portion 7c of the housing 7. Thus, a bottom gap Gb is defined between the lower end surface 8b of the bearing member 8 and the upper end surface 10a of the thrust plate 10.

Figure 3:
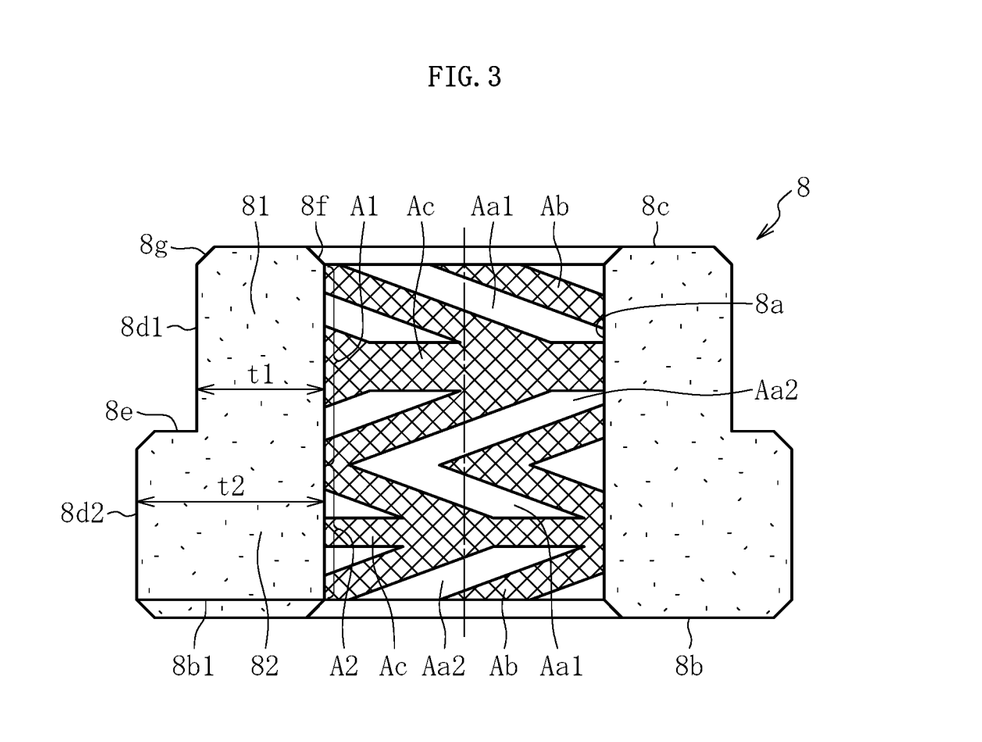
FIG. 3 is a longitudinal sectional view of a bearing member.

The inner peripheral surface 8a of the bearing member 8 has two radial bearing surfaces which define a radial bearing gap Gr (see FIG. 4A) of the radial bearing portions R1 and R2 with the outer peripheral surface 2a of the shaft member 2 to which the radial bearing surfaces are opposed. As illustrated in FIG. 3, the two radial bearing surfaces comprise dynamic pressure generating portions (radial dynamic pressure generating portions) A1 and A2 configured to generate a dynamic pressure action in the lubricating oil 11 in the radial bearing gap Gr, respectively.

The radial dynamic pressure generating portion A1 on the upper side comprises a plurality of upper dynamic pressure generating grooves Aa1, a plurality of lower dynamic pressure generating grooves Aa2, and hill portions. The plurality of upper dynamic pressure generating grooves Aa1 are inclined with respect to the axial direction, and are separated apart from each other in a circumferential direction. The plurality of lower dynamic pressure generating grooves Aa2 are inclined in a direction opposite to the upper dynamic pressure generating grooves Aa1, and are separated apart from each other in the circumferential direction. The hill portions have a protruding shape, and divide the dynamic pressure generating grooves Aa1 and Aa2. The hill portions form a herringbone shape as a whole. That is, the hill portions having a protruding shape comprise inclined hill portions Ab and annular hill portions Ac. The inclined hill portions Ab are each formed between dynamic pressure generating grooves adjacent to each other in the circumferential direction. The annular hill portions Ac are each formed between the upper dynamic pressure generating grooves Aa1 and the lower dynamic pressure generating grooves Aa2. In the illustrated example, axial dimensions of the upper dynamic pressure generating grooves Aa1 and the lower dynamic pressure generating grooves Aa2 forming the radial dynamic pressure generating portion A1 are set so as to be equal to each other. However, the axial dimension of the upper dynamic pressure generating grooves Aa1 may be set so as to be larger than the axial dimension of the lower dynamic pressure generating grooves Aa2.

The radial dynamic pressure generating portion A2 on the lower side has the same basic structure as the radial dynamic pressure generating portion A1 on the upper side. However, in this embodiment, axial dimensions of the dynamic pressure generating grooves Aa1 and Aa2 forming the radial dynamic pressure generating portion A2 are smaller than the axial dimensions of the dynamic pressure generating grooves Aa1 and Aa2 forming the radial dynamic pressure generating portion A1. Not limited to such configuration, the axial dimensions of the dynamic pressure generating grooves Aa1 and Aa2 forming the radial dynamic pressure generating portion A2 may be equal to the axial dimensions of the dynamic pressure generating grooves Aa1 and Aa2 forming the radial dynamic pressure generating portion A1.

In this embodiment, a lower end portion of the radial dynamic pressure generating portion A1 and an upper end portion of the radial dynamic pressure generating portion A2 are connected to each other. That is, in this embodiment, the two radial dynamic pressure generating portions A1 and A2 are continuously formed. Not limited to such configuration, the two radial dynamic pressure generating portions A1 and A2 may be formed so as to be separated from each other in the axial direction.

Figures 5A, 5B:
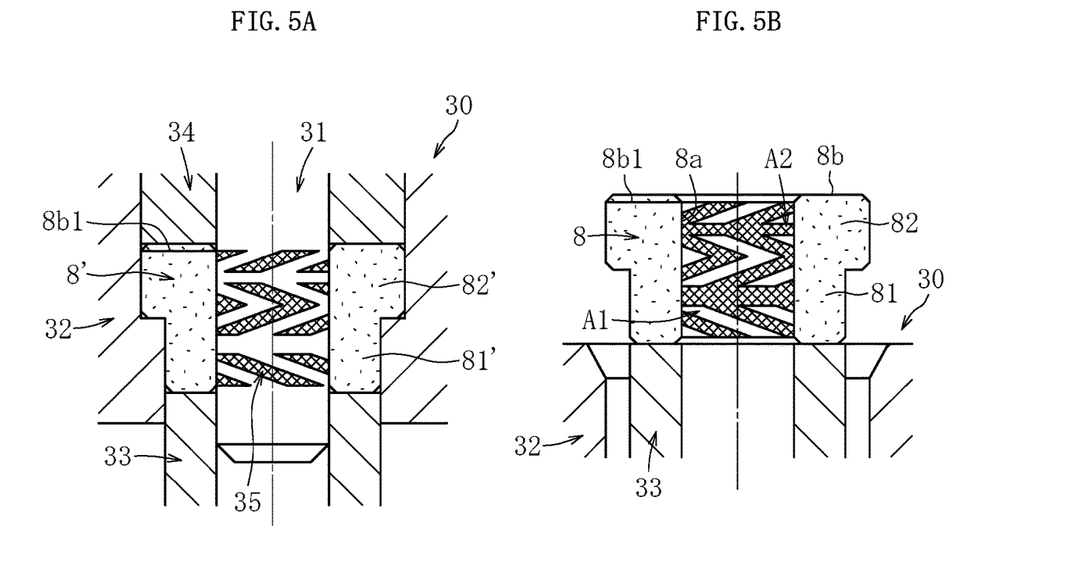
FIG. 5A is a schematic view for illustrating a state in which sizing is performed on a bearing material.
FIG. 5B is a schematic view for illustrating a termination stage of sizing on the bearing material.

The bearing member 8 having the configuration described above is formed of a porous body, specifically, a porous body of sintered metal containing copper or iron as a main component, and is used under a state in which the lubricating oil 11 is impregnated in internal pores of the bearing member 8. When the bearing member 8 is formed of the porous body of the sintered metal as described above, the dynamic pressure generating portions A1 and A2 are formed, as schematically illustrated in FIG. 5A, simultaneously with sizing (size correction processing) on a bearing material 8' formed of a sintered body. Thus, the inner peripheral surface 8a of the bearing member 8 in this embodiment is a molded surface molded with a sizing die. Moreover, the outer peripheral surfaces 8d1 and 8d2 are also formed into a molded surface molded with a sizing die. The radial grooves 8b1 formed in the lower end surface 8b of the bearing member 8 is molded simultaneously with compression molding of a green compact being a base material of the bearing material 8'. In the following, among manufacturing steps for the bearing member 8, a sizing step is described in detail with reference to FIG. 5A and FIG. 5B.

A sizing die 30 illustrated in FIG. 5A comprises a sizing core 31, a die 32, a lower punch 33, and an upper punch 34, which are coaxially arranged. The sizing core 31, the lower punch 33, and the upper punch 34 can be raised and lowered by a drive mechanism (not shown). An outer peripheral surface of the sizing core 31 has a mold portion 35 having a protruding shape (illustrated with cross-hatching in FIG. 5A) which corresponds to the shape of the radial dynamic pressure generating portions A1 and A2 (forming the dynamic pressure generating grooves Aa1 and Aa2). The bearing material 8' brought to the sizing die 30 is formed into a stepped cylindrical shape, which integrally comprises a first cylindrical portion 81' and a second cylindrical portion 82' (which are finally formed into the small-diameter cylindrical portion 81 and the large-diameter cylindrical portion 82) corresponding to the small-diameter cylindrical portion 81 and the large-diameter cylindrical portion 82, respectively, which form the bearing member 8. Inner peripheral surfaces of the cylindrical portions 81' and 82' are each formed so as to have a cylindrical surface having a constant diameter without recesses and protrusions.

In the sizing die 30 having the configuration described above, first, the bearing material 8' having the first cylindrical portion 81' arranged on a lower side is placed on an upper end surface of the lower punch 33, and then the sizing core 31 is lowered so that the sizing core 31 is inserted along an inner periphery of the bearing material 8'. Next, the upper punch 34 is lowered so that the bearing material 8' is sandwiched by the punches 33 and 34 in the axial direction. After that, the sizing core 31, the upper punch 34, and the lower punch 33 are integrally lowered so that the bearing material 8' is inserted (press-fitted) along an inner periphery of the die 32. After the bearing material 8' has been press-fitted along the inner periphery of the die 32, when the upper punch 34 is further lowered, the bearing material 8' is expanded and deformed in the radial direction. As a result, the inner peripheral surface and the outer peripheral surface of the bearing material 8' are strongly pressed against the outer peripheral surface of the sizing core 31 and the inner peripheral surface of the die 32, respectively. With this, the inner peripheral surface of the bearing material 8' is deformed in conformity with the outer peripheral surface of the sizing core 31 having the mold portion 35. Thus, the radial dynamic pressure generating portions A1 and A2 are molded on the inner peripheral surface of the bearing material 8', and the outer peripheral surface of the bearing material 8' is deformed in conformity with the inner peripheral surface of the die 32 (see FIG. 5B with regard to this description).

After that, the sizing core 31, the upper punch 34, and the lower punch 33 are integrally raised to discharge the bearing material 8' from the die 32. Then, the upper punch 34 is further raised. With this, all the compression force having been applied to the bearing material 8' is released, and spring back occurs in the bearing material 8'. Thus, the recess/protrusion fitting state between the inner peripheral surface of the bearing material 8' and the mold portion 35 of the sizing core 31 is released. After that, the sizing core 31 is raised to be separated from the mold. As a result, as illustrated in FIG. 5B, the bearing member 8 comprising the radial dynamic pressure generating portions A1 and A2 molded on the inner peripheral surface can be obtained.

When the difference in radial thickness between the cylindrical portions 81 and 82 (81' and 82') is excessively large, at the time of sizing on the bearing material 8' in the mode described above, a large difference occurs in radial deformation amount between the cylindrical portions 81' and 82' (more specifically, the spring back amount given when all the compression force applied to the bearing material 8' is released). Therefore, there is a fear in that the inner peripheral surface (radial bearing surfaces) of the bearing material 8' cannot be finished with a predetermined shape and accuracy. In this case, there is a fear in that the radial dynamic pressure generating portion A1 and A2 cannot be molded with a predetermined shape and accuracy. Therefore, the cylindrical portions 81 and 82 (81' and 82') are formed so that a ratio (t2/t1) of a radial thickness (t2: see FIG. 3) of the large-diameter cylindrical portion 82 to a radial thickness of the small-diameter cylindrical portion 81 (t1: see FIG. 3) is set to be less than 2.5, more preferably, equal to or less than 2.

The ratio (t2/t1) described above is a value which has been derived by the inventor of the present invention through a verification test. Specifically, the inventor of the present invention produced first to third test bodies (sintered bodies) which were made with the same material under the same condition but had different ratios described above. Further, the inventor prepared three types of sizing dies in accordance with the shapes of the test bodies (more in detail, three types of dies, upper punches, and lower punches in accordance with outer peripheral shapes of the test bodies. Then, sizing was performed on the test bodies at the same pressure through use of sizing dies prepared for the test bodies to mold the plurality of dynamic pressure generating grooves on inner peripheral surfaces of the test bodies. After that, quality is evaluated based on the molding accuracy of the dynamic pressure generating grooves. The following evaluation criterion was used. Moreover, ratios and test results (evaluations) for the test bodies are shown in Table 1 given below.

[Evaluation Criterion]

Pass (o): variation in groove depths of the dynamic pressure generating grooves is equal to or less than 2 μm Fail (x): variation in groove depths of the dynamic pressure generating grooves is more than 2 μm

TABLE 1

|  | Ratio (= t2/t1) | Evaluation |
| --- | --- | --- |
| First test body | 1 | o |
| Second test body | 2 | o |
| Third test body | 2.5 | x |

The bearing member 8 having the configuration described above is fixed along the inner periphery of the housing 7 by sandwiching the large-diameter cylindrical portion 82 from both sides in the axial direction with the annular member 9, which is interposed between the small-diameter cylindrical portion 81 and the tubular portion 7a of the housing 7, and (the step portion 7c formed at a radially outer end of) the bottom portion 7b of the housing 7. The annular member 9 is formed of a non-porous material such as resin or metal and is fixed with respect to the tubular portion 7a of the housing 7 by, for example, press-fitting, bonding, or press-fit bonding (both press-fitting and bonding). The upper end surface 9c of the annular member 9 is at the same level as the upper end surface 8c of the bearing member 8 and the upper end surface of the tubular portion 7a of the housing 7.

The fitting of the small-diameter cylindrical portion 81 of the bearing member 8 with respect to the annular member 9 and the fitting of the large-diameter cylindrical portion 82 with respect to the tubular portion 7a of the housing 7 are loose fitting. Thus, as illustrated in the enlarged view in FIG. 2, under the state in which the bearing member 8 is fixed along the inner periphery of the housing 7, a radial gap 12 is defined between the inner peripheral surface 9b of the annular member 9 and the outer peripheral surface 8d1 of the small-diameter cylindrical portion 81, and a radial gap 13 is defined between the inner peripheral surface 7a1 of the tubular portion 7a of the housing 7 and the outer peripheral surface 8d2 of the large-diameter cylindrical portion 82. With this, degradation in gap width accuracy of the radial bearing gap Gr caused by deformation of the inner peripheral surface 8a of the bearing member 8 and degradation in bearing performance of the radial bearing portions R1 and R2, which are concerned when tight fitting is employed as fitting of the cylindrical portion 81 with respect to the annular member 9 and fitting of the cylindrical portion 82 with respect to the tubular portion 7a of the housing 7, can be prevented as much as possible.

Figure 6A:
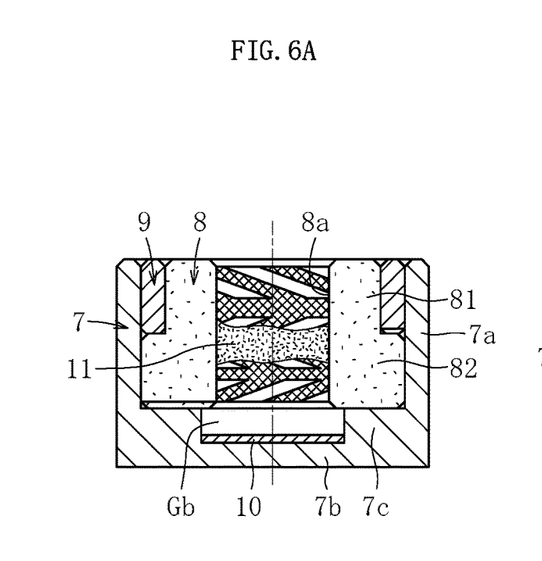
FIG. 6A is a view for illustrating an oil-injection stage in an assembly step of the fluid dynamic bearing device.
Figure 6B:
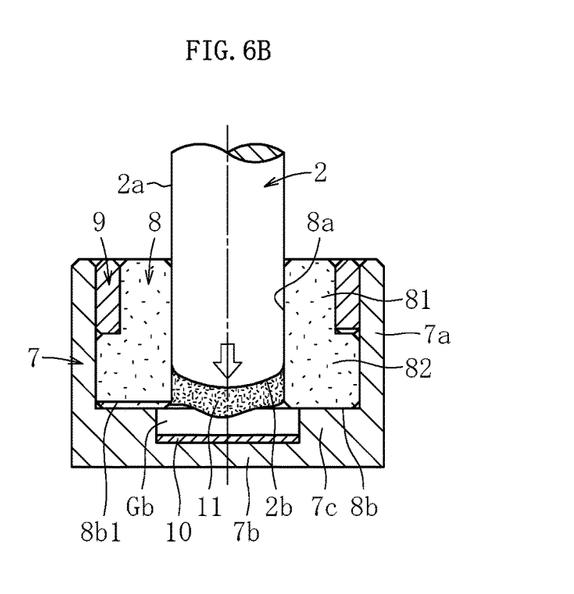
FIG. 6B is a view for illustrating an insertion stage of a shaft member in the assembly step of the fluid dynamic bearing device.

The fluid dynamic bearing device 1 having the configuration described above is assembled, for example, in the procedure described below. First, as illustrated in FIG. 6A, an assembly in which the bearing member 8 (specifically, the bearing member 8 in which the lubricating oil 11 is impregnated into the internal pores) and the annular member 9 are fixed along the inner periphery of the housing 7 in the mode described above is produced, and then a predetermined amount of lubricating oil 11 is charged along the inner periphery of the bearing member 8. Next, as illustrated in FIG. 6B, the shaft member 2 is inserted along the inner periphery of the bearing member 8. At this time, along with the insertion of the shaft member 2, the lubricating oil 11 charged along the inner periphery of the bearing member 8 in advance is forced toward the bottom gap Gb side by the lower end surface 2b of the shaft member 2. Moreover, the lubricating oil 11 is charged into the radial gap (radial bearing gap Gr) between the outer peripheral surface 2a of the shaft member 2 and the inner peripheral surface 8a of the bearing member 8 along the outer peripheral surface 2a of the shaft member 2.

Along with the insertion of the shaft member 2, air present in the internal space of the housing 7 is compressed. The compressed air is released to the atmosphere through a radial air passage defined by the radial groove 8b1 formed in the lower end surface 8b of the bearing member 8, the radial gap 13 (see FIG. 2) defined between the inner peripheral surface 7a1 of the tubular portion 7a of the housing 7 and the outer peripheral surface 8d2 of the large-diameter cylindrical portion 82, a radial air passage defined by the radial groove 9a1 formed in the lower end surface 9a of the annular member 9, and the radial gap 12 (see FIG. 2) defined between the inner peripheral surface 9b of the annular member 9 and the outer peripheral surface 8d1 of the small-diameter cylindrical portion 81. Therefore, the internal pressure of the housing 7 is increased along with the insertion of the shaft member 2. With this, the situation in which the lubricating oil 11 is forced out to the outside of the device is prevented as much as possible.

Although illustration is omitted, in order to improve air-discharging performance, an axial groove may be formed on any one of or both of opposed surfaces defining each of the radial gaps 12 and 13. Moreover, the air passage extending in the radial direction described above may be formed of a radial groove formed in the upper end surface 7c1 of the step portion 7c of the housing 7 or in a step surface 8e of the bearing member 8.

The amount of the lubricating oil 11 to be charged along the inner periphery of the bearing member 8 at the time of assembly of the fluid dynamic bearing device 1 in the procedure described above is set to such an amount that, under a state in which the fluid dynamic bearing device 1 is arranged in the posture illustrated in FIG. 2, at least the radial gap between the outer peripheral surface 2a of the shaft member 2 and the inner peripheral surface 8a of the bearing member 8 (the radial bearing gap Gr at the radial bearing portions R1 and R2) and the bottom gap Gb are charged with the lubricating oil 11. Further, the amount of the lubricating oil 11 is adjusted and set so that, even the volume expansion of the lubricating oil 11 along with the rise in temperature occurs such as during the operation of the fluid dynamic bearing device 1, the oil level of the lubricating oil 11 is positioned on a lower side with respect to an upper end portion of the chamfered portion 8f formed at the upper-end inner peripheral edge portion of the bearing member 8 (see FIG. 4A) and within a range of the radial gap in the axial direction (see FIG. 4B). That is, in the fluid dynamic bearing device 1 according to this embodiment, a full-fill structure in which the entirety of the inner space of the housing 7 is filled with the lubricating oil is not employed, and a partial-fill structure in which the lubricating oil 11 is interposed in some regions of the internal space of the housing 7 is employed. As the lubricating oil 11, there may be suitably used ester-based, PAO-based, or fluorine-based lubricating oil in consideration of, for example, temperature changes during use or transport of the fluid dynamic bearing device 1.

In the fluid dynamic bearing device 1 having the configuration described above, when the shaft member 2 rotates, the radial bearing gaps Gr and Gr are each defined between the upper and lower radial bearing surfaces formed in the inner peripheral surface 8a of the bearing member 8 and the outer peripheral surface 2a of the shaft member 2 opposed thereto. Then, along with the rotation of the shaft member 2, pressure of an oil film formed in the radial bearing gaps Gr and Gr is increased by the dynamic pressure action of the radial dynamic pressure generating portions A1 and A2. Thus, the radial bearing portions R1 and R2 configured to support the shaft member 2 in the radial direction in a non-contact manner are formed at two positions in the axial direction.

In this embodiment, as described above, the axial dimensions of the dynamic pressure generating grooves Aa1 and Aa2 forming the radial dynamic pressure generating portion A1 are set so as to be larger than the axial dimensions of the dynamic pressure generating grooves Aa1 and Aa2 forming the radial dynamic pressure generating portion A2. With this, the stiffness of the oil films formed in the radial bearing gaps Gr of the radial bearing portions R1 and R2 along with the rotation of the shaft member 2, that is, the bearing stiffnesses of the radial bearing portions R1 and R2 are set so as to be higher at the radial bearing portion R1 than at the radial bearing portion R2. This is because, in relation to the configuration in which the rotary side of the motor (rotary body) is formed of the shaft member 2 and the rotor 3 mounted to an upper end of the shaft member 2 and a gravity center G of the rotary body is present at a position shifted to the upper side with respect to the center portion of the shaft member 2 in the axial direction as illustrated in FIG. 2, it is advantageous to set the bearing stiffness of the radial bearing portion R1 on the upper side to be relatively higher for prevention of whirling of the rotary body as much as possible.

Moreover, when the shaft member 2 rotates, the radial bearing portions R1 and R2 are formed, and at the same time, a thrust bearing portion T for supporting the shaft member 2 in a contact manner in the thrust direction on the inner bottom surface 7b1 of the housing 7 (upper end surface 10a of the thrust plate 10) is formed. As described above with reference to FIG. 1, the magnetic force being the external force for urging the shaft member 2 toward the lower side is caused to act on the shaft member 2. Thus, excessive floating of the shaft member 2 and removal from the inner periphery of the bearing member 8 during the rotation of the shaft member 2 can be prevented as much as possible.

As described above, in the fluid dynamic bearing device 1 according to the present invention, the bearing member 8 is fixed along the inner periphery of the housing 7 under the state in which the upper end surface 8c of the bearing member 8 is exposed to the atmosphere. The configuration described above corresponds to the configuration of the fluid dynamic bearing device disclosed in Patent Literatures 1 and 2 in which the annular member is omitted, which is arranged along the inner periphery of an end portion on one end side of the opening side of the housing. Therefore, even without changing the axial dimension of the bearing member 8 and the bearing stiffness of the radial bearing portions R1 and R2, the axial dimension of the housing 7 can be reduced at least by the axial dimension of the seal member, thereby being capable of reducing the size of the entire fluid dynamic bearing device 1.

Moreover, the small-diameter cylindrical portion 81 and the large-diameter cylindrical portion 82 having different outer diameter dimensions are integrally formed in the bearing member 8, and the bearing member 8 is fixed along the inner periphery of the housing 7 by sandwiching the large-diameter cylindrical portion 82 from both sides in the axial direction with the annular member 9 and the bottom portion 7b (step portion 7c formed integrally with the bottom portion 7b) of the housing 7. Therefore, the assembly step is simplified, thereby being capable of reducing the manufacturing cost for the fluid dynamic bearing device 1.

Moreover, in the fluid dynamic bearing device 1 according to the present invention, the shaft member 2 is insertable and removable with respect to the bearing member 8, and the partial-fill structure in which the entirety of the inner space of the housing 7 is not filled with the lubricating oil 11. Therefore, as described above, the lubricating oil 11 of a required amount can be interposed in the internal space of the housing 7 by only charging the lubricating oil 11 into the internal space of the housing 7 (inner periphery of the bearing member 8) through use of an appropriate oil-feeding tool after fixing the bearing member 8 and the annular member 9 along the inner periphery of the housing 7 and before inserting the shaft member 2 along the inner periphery of the bearing member 8. Therefore, use of large-scale equipment for charging oil (for example, vacuum impregnation device) or adjustment/management operations for oil level with high accuracy is not required. With this, the manufacturing cost for the fluid dynamic bearing device 1 can be further reduced.

Figure 4A:
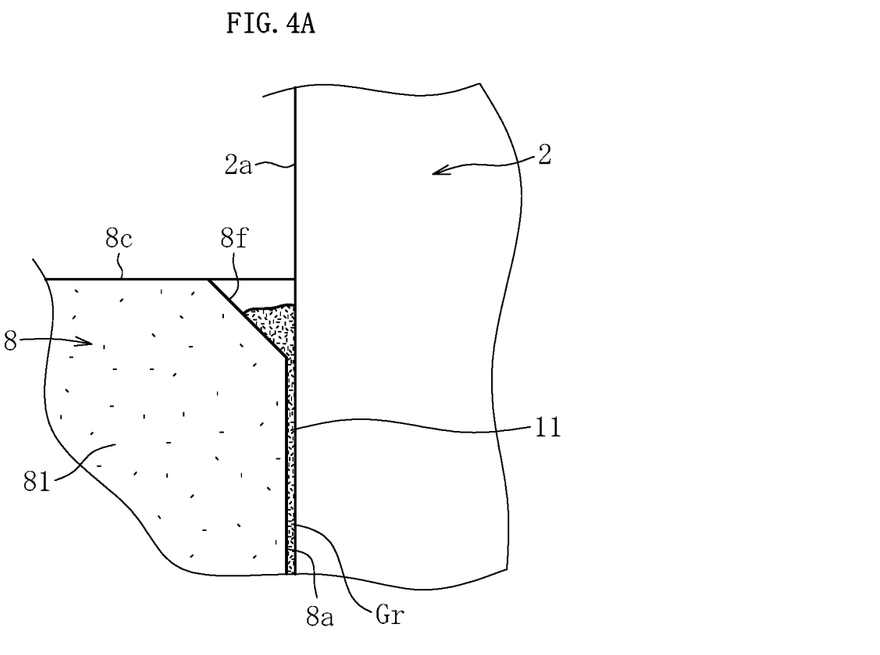
FIG. 4A is a partial enlarged sectional view of the fluid dynamic bearing device during operation.
Figure 4B:
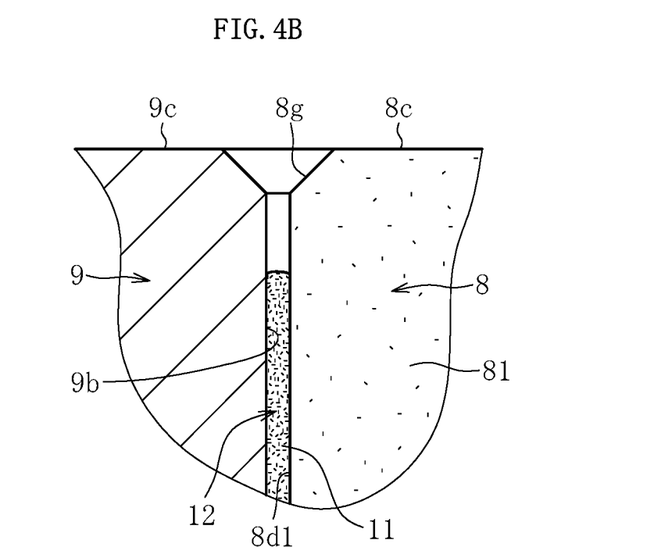
FIG. 4B is a partial enlarged sectional view of the fluid dynamic bearing device during operation.

In the fluid dynamic bearing device 1 according to the present invention, the annular member 9 is arranged in the mode described above. Thus, the seal space in which the oil level of the lubricating oil provided in the fluid dynamic bearing device of, for example, Patent Literature 1 is omitted. Therefore, it can be considered that the fear of causing the problem of degradation in bearing performance due to leakage of the lubricating oil 11 to the outside is increased. However, the fear of causing leakage of the lubricating oil 11 to the outside can be effectively reduced through, for example, (1) adjustment of the charging amount of the lubricating oil 11 into the internal space of the housing 7 so that the oil level of the lubricating oil 11 is positioned on the lower side with respect to the upper end portion of the chamfered portion 8f formed in the upper-end inner peripheral edge portion of the bearing member 8 within the use temperature range of the fluid dynamic bearing device 1 [see FIG. 4(a)], (2) formation of the bearing member 8 of the porous body made of the sintered metal, and (3) formation of the radial bearing gaps Gr of the radial bearing portions R1 and R2 at the inner peripheral surface 8a of the bearing member 8 adjacent to the chamfered portion 8f of the bearing member 8 in the axial direction.

That is, in particular, with the configuration (2) described above, the lubricating oil 11 is taken into the internal pores of the bearing member 8 which become relatively lower in pressure when the pressure of the lubricating oil 11 interposed in the radial bearing gap Gr of the radial bearing portions R1 and R2 increases along with the rotation of the shaft member 2. Moreover, with the configuration (3) described above, a gap width of the radial bearing gap Gr is generally set to a small width of about several micrometers. Therefore, even when the oil level of the lubricating oil 11 is raised to such an extent of being positioned within the range of the chamfered portion 8f in the axial direction, the lubricating oil 11 is taken to the bearing inner side (radial bearing gap Gr) by a capillary force.

In the foregoing, description is made of the fluid dynamic bearing device 1 according to the embodiment of the present invention. However, various changes can be made on the components of the fluid dynamic bearing device 1 within the range of not departing from the gist of the present invention.

Figure 7:
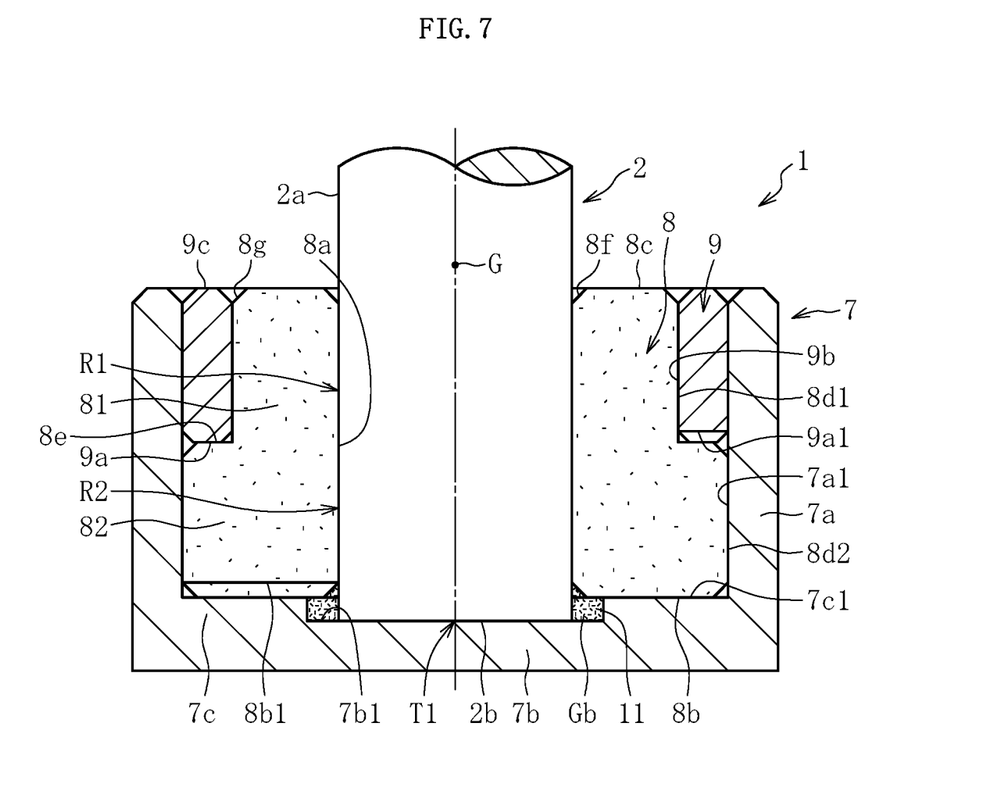
FIG. 7 is a sectional view for illustrating a fluid dynamic bearing device according to another embodiment of the present invention.

For example, the thrust bearing portion T configured to support the shaft member 2 may be formed of so-called "fluid dynamic bearing". FIG. 7 is an illustration of an example of the fluid dynamic bearing device 1 comprising the thrust bearing portion T being formed of the fluid dynamic bearing. In this case, the lower end surface 2b of the shaft member 2 is formed into a flat surface extending in a direction orthogonal to an axis. Although illustration is omitted, a dynamic pressure generating portion (thrust dynamic pressure generating portion) such as dynamic pressure generating grooves is formed on any one of the lower end surface 2b of the shaft member 2 and the inner bottom surface 7b1 of the housing 7 opposed to the lower end surface 2b of the shaft member 2.

Figure 8A:
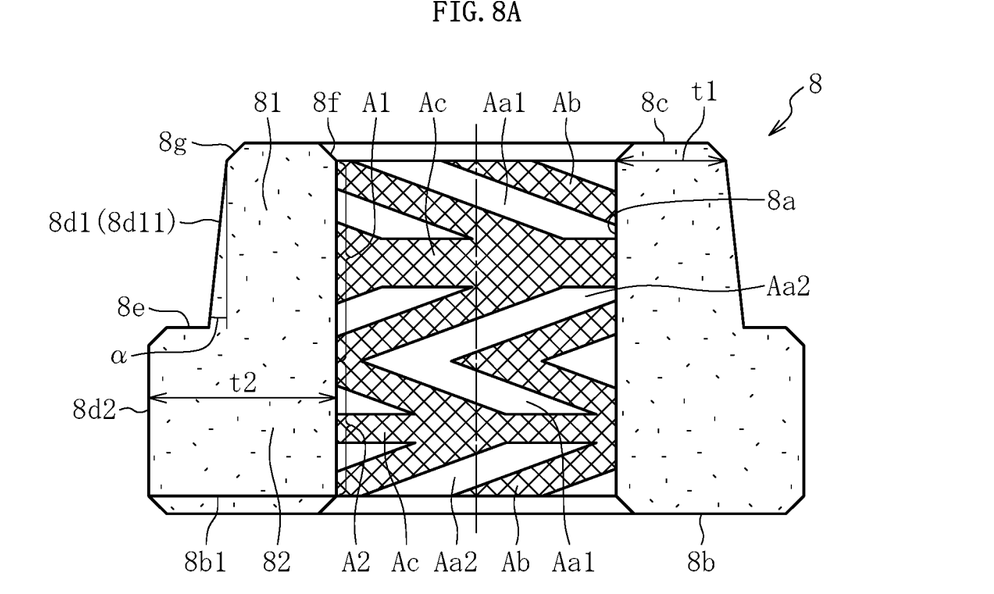
FIG. 8A is a longitudinal sectional view of a bearing member in a modification example.
Figure 8B:
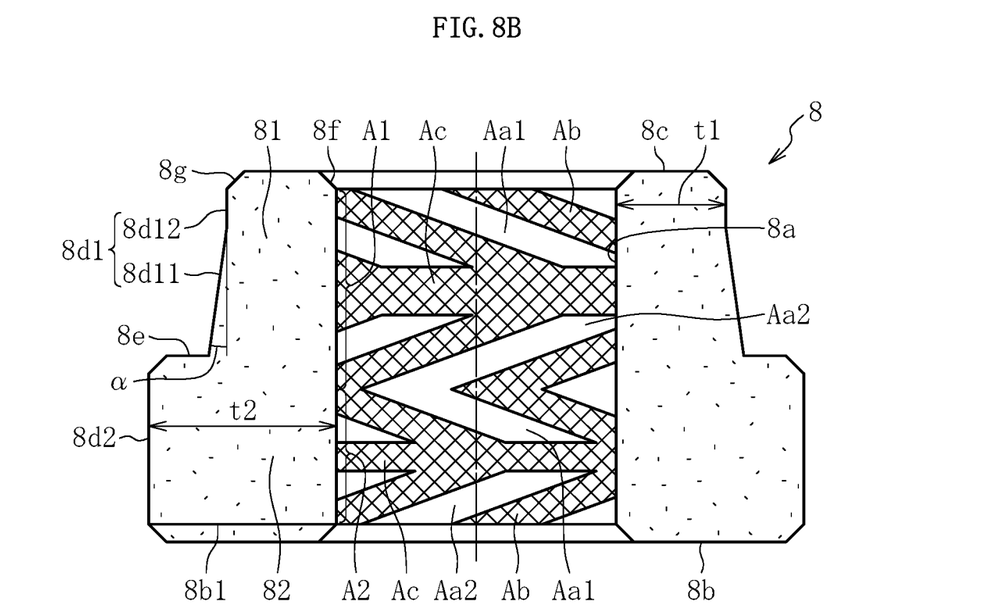
FIG. 8B is a longitudinal sectional view of a bearing member in a modification example.

Moreover, in the embodiment described above, the outer peripheral surfaces 8d1 and 8d2 of the small-diameter cylindrical portion 81 and the large-diameter cylindrical portion 82 forming the bearing member 8 are each formed into a cylindrical surface having a constant diameter. However, in the outer peripheral surface 8d1 of the small-diameter cylindrical portion 81, as illustrated in FIG. 8A and FIG. 8B, there may be formed a tapered surface 8d11 which is gradually reduced in diameter from the bottom portion 7b side (lower side) toward the opening side (upper side) of the housing 7. FIG. 8A is an illustration of an example of a case in which the entire region of the outer peripheral surface 8d1 of the small-diameter cylindrical portion 81 is formed of the tapered surface 8*d*11 described above. FIG. 8B is an illustration of an example of a case in which the outer peripheral surface 8*d*1 of the small-diameter cylindrical portion 81 is formed of the tapered surface 8*d*11 described above and a cylindrical surface 8*d*12, which is formed on an upper side with respect to the tapered surface 8*d*11 and has a constant diameter. In the configuration illustrated in FIG. 8B, a lower end of the cylindrical surface 8*d*12 is connected to an upper end of the tapered surface 8*d*11, and an upper end of the cylindrical surface 8*d*12 is connected to the upper end surface 8*c* through the chamfered portion 8*g*.

Figure 9A:
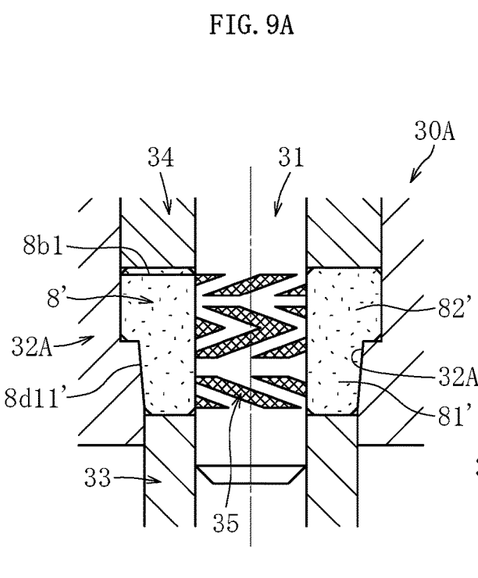
FIG. 9A is a schematic view for illustrating a state in which sizing is performed on a bearing material which is to be finally formed into the bearing member illustrated in FIG. 8A.
Figure 9B:
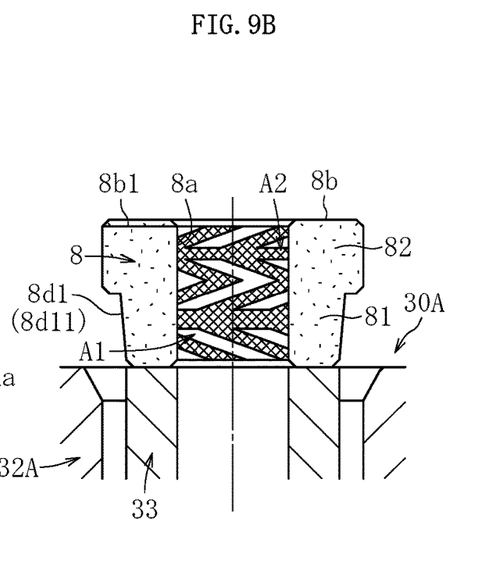
FIG. 9B is a schematic view for illustrating a termination stage of sizing on the bearing material.

Now, with reference to FIG. 9A and FIG. 9B, detailed description is made of a sizing step of performing sizing on a material of the bearing member 8 (bearing material 8' formed of the sintered body) among the bearing members 8 illustrated in FIG. 8A and FIG. 8B.

A sizing die 30A illustrated in FIG. 9A and FIG. 9B has a configuration of the sizing die 30 illustrated in FIG. 5A and FIG. 5B except that the die 32 is replaced with a die 32A having a different configuration. The sizing core 31, the upper punch 33, and the lower punch 34 have substantially the same configuration as the sizing die 30 illustrated in FIG. 5A and FIG. 5B. The die 32A has a configuration which is different from that of the die 32 illustrated in FIG. 5A in that a portion of the inner wall surface thereof which is opposed to the outer peripheral surface of the first cylindrical portion 81' of the bearing material 8' (portion forming the outer peripheral surface of the first cylindrical portion 81') is formed in the tapered surface 32Aa corresponding to the tapered surface 8*d*11. Moreover, although detailed illustration is omitted, in the bearing material 8' to be brought to the sizing die 30A, the outer peripheral surface of the first cylindrical portion 81' is formed into the tapered surface 8*d*11' substantially conforming to the tapered surface 8*d*11 of the small-diameter cylindrical portion 81. Such tapered surface 8*d*11' is molded at the time of forming the green compact being the base material for the bearing material 8'.

As illustrated in FIG. 9A and FIG. 9B, sizing through use of the sizing die 30A is performed in a manner similar to that the sizing through use of the sizing die 30 described with reference to FIG. 5A and FIG. 5B. At this time, with the configuration in which the tapered surface 32Aa described above is formed in the inner peripheral surface of the die 32A of the sizing die 30A and the configuration in which the tapered surface 8*d*11' is formed in the outer peripheral surface of the first cylindrical portion 81' of the bearing material 8' inserted (press-fitted) into the tapered surface 32Aa, the first cylindrical portion 81' of the bearing material 8' can be smoothly fitted into the inner peripheral surface of the die 32A, and the bearing material 8' after the sizing has been completed can be removed from the mold. Therefore, when the sizing is to be performed on the bearing material 8', the fear of causing defects such as scuffs and flaws on the outer peripheral surface (tapered surface 8*d*11') of the first cylindrical portion 81' can be effectively reduced. Thus, the outer peripheral surface 8*d*1 of the small-diameter cylindrical portion 81 having the tapered surface 8*d*11 (being formed of the tapered surface 8*d*11) can be formed into a finished (molded) surface with higher accuracy as compared to the case in which the entire region of the outer peripheral surface 8*d*1 of the small-diameter cylindrical portion 81 is formed into a cylindrical surface having a constant diameter.

It is preferred that an inclination angle (angle formed between the tapered surface 8*d*11 and a straight line extending in the axial direction) α of the tapered surface 8*d*11 formed in the outer peripheral surface e8*d*1 of the bearing member 8, in other words, an inclination angle of the tapered surface 32Aa formed in the die 32A of the sizing die 30A be set so as to be equal to or larger than 3°, more preferably, equal to or larger than 4°. This is because the operations and effects described above, which can be achieved through formation of the tapered surface, cannot be effectively enjoyed when the inclination angle α described above is less than 3°. Meanwhile, when the inclination angle α described above is excessively large, in the bearing material 8', there is a fear of causing a large difference between a sizing margin at an upper end portion of the tapered surface 8*d*11' and a sizing margin at a lower end portion of the tapered surface 8*d*11', and such difference may adversely affect, for example, molding accuracy of the inner peripheral surface 8*a* (radial dynamic pressure generating portion A1) of the bearing member 8. Therefore, it is preferred that an upper limit value of the inclination angle α described above be set so as to be equal to or smaller than 10°.

In the embodiment described above, the housing 7 provided separately from the motor base 6 is fixed along the inner periphery of the motor base 6. However, a part corresponding to the motor base 6 may be formed integrally with the housing 7.

Moreover, one or both of the radial bearing portions R1 and R2 may be formed of known other fluid dynamic bearing such as so-called multi-arc bearing, step bearing, and wave-shaped bearing. In addition, without providing the radial dynamic pressure generating portion to any of two surfaces opposed to each other through the radial bearing gap Gr, both of the two surfaces may be formed of a perfect-circle bearing having both the two surfaces formed into a cylindrical surface.

Moreover, in the embodiment described above, the rotor magnet 4 and the stator coil 5 arranged apart from each other with respect to the axial direction so that the external force for urging the shaft member 2 toward the lower side acts on the shaft member 2. However, means for causing such external force to act on the shaft member 2 is not limited to those described above. Although illustration is omitted, for example, a magnetic member which may attract the rotor magnet 4 may be arranged opposed to the rotor magnet 4 in the axial direction to allow the magnetic force to act on the rotor 3 and the shaft member 2. Moreover, when the thrust force being a repulsive force against the air-sending operation is sufficiently large, and the shaft member 2 can be urged toward the lower side with only the thrust force, it is not required to cause the magnetic force (magnetic attraction force) being the external force to act on the shaft member 2.

Figure 10A:
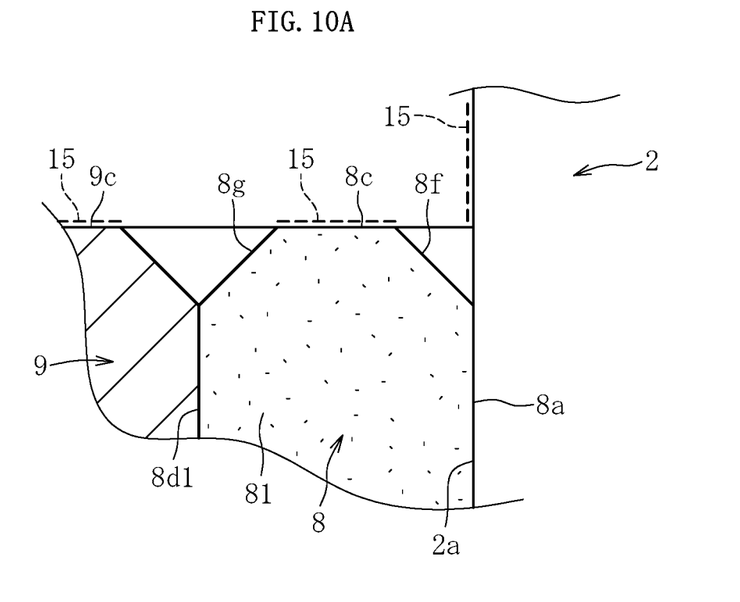
FIG. 10A is a partial enlarged view of a fluid dynamic bearing device according to a modification example.
Figure 10B:
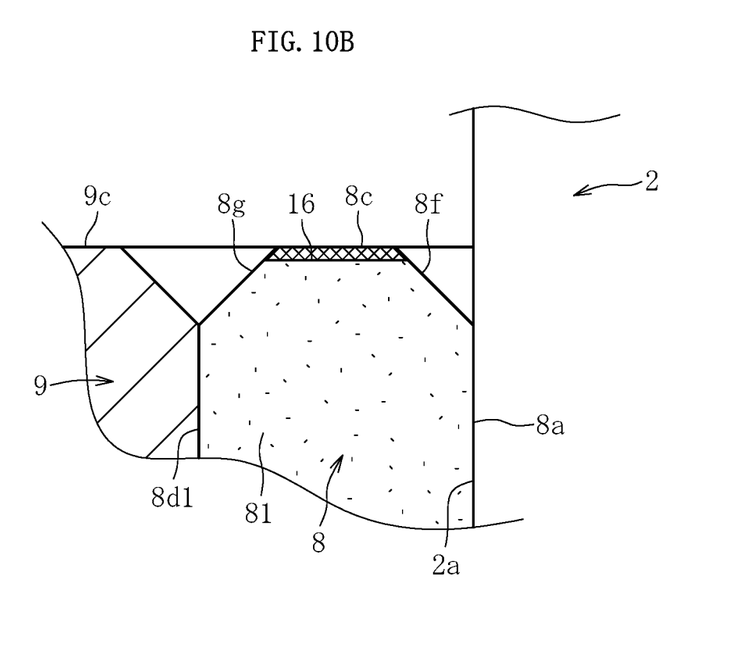
FIG. 10B is a partial enlarged view of a fluid dynamic bearing device according to a modification example.

Moreover, in order to prevent leakage of the lubricating oil 11 to the outside, which is interposed in the radial gap (radial bearing gap Gr) between the inner peripheral surface 8*a* of the bearing member 8 and the outer peripheral surface 2*a* of the shaft member 2 or in the radial gap 12 (see FIG. 2 and FIG. 4B) between the outer peripheral surface 8*d*1 of the bearing member 8 and the inner peripheral surface 9*b* of the annular member 9, as illustrated in FIG. 10A, an oil-repellent film 15 may be provided to the upper end surface 8*c* of the bearing member 8, the upper end surface 9*c* of the annular member 9, and the outer peripheral surface 2*a* of the shaft member 2, which are exposed to the atmosphere. Moreover, in order to prevent exudation of the lubricating oil 11 having been impregnated into the internal pores of the bearing member 8 to the outside of the device through surface opening holes of the upper end surface 8*c* of the bearing member 8, as illustrated in FIG. 10B, a hole-closing portion 16 configured to substantially eliminate a porous structure at a top layer portion including the upper end surface 8*c* of the bearing member 8 may be formed in the bearing member 8. The hole-closing portion 16 may be formed by so-called "clogging processing", or may be formed by causing a hole-closing material such as resin to be impregnated and cured. Only any one of the configurations illustrated in FIG. 10A and FIG. 10B may be employed, or both of the configurations may be employed.

Moreover, in the foregoing, description is made of the case in which the present invention is applied to the fluid dynamic bearing device 1 in which the rotor 3 comprising the vanes for sending air is provided to the shaft member 8. However, the present invention may be suitably applied also to the fluid dynamic bearing device 1 in which a disc hub having a disc mounting surface or a polygon mirror is provided to the shaft member 2. That is, the present invention may be suitably applied not only to the fan motor illustrated in FIG. 1 but also to the fluid dynamic bearing device 1 to be incorporated into a motor for other electric equipment such as a spindle motor for a disc device or a polygon scanner motor for a laser beam printer (LBP).

REFERENCE SIGNS LIST

1 fluid dynamic bearing device
2 shaft member
3 rotor
7 housing
7a tubular portion
7b bottom portion
8 bearing member
8d11 tapered surface
8d12 cylindrical surface
8f chamfered portion
9 annular member
11 lubricating oil
12 radial gap
13 radial gap
81 cylindrical portion
82 large-diameter cylindrical portion
A1, A2 radial dynamic pressure generating portion
Gb bottom gap
Gr radial bearing gap
R1, R2 radial bearing portion
T thrust bearing portion
t1 radial thickness of small-diameter cylindrical portion
t2 radial thickness of large-diameter cylindrical portion

The invention claimed is:

1. A fluid dynamic bearing device, comprising:
    a housing having a bottomed cylindrical shape with an end portion on one end side in an axial direction being opened and an end portion on another end side in the axial direction being closed,
    a bearing member, which is arranged along an inner periphery of the housing, and has a chamfered portion at an inner peripheral edge portion on one end side in the axial direction, the bearing member being porous; and
    a radial bearing portion, which is configured to support a shaft member in a radial direction with an oil film of lubricating oil formed in a radial bearing gap defined between an inner peripheral surface of the bearing member and an outer peripheral surface of the shaft member to be inserted along an inner periphery of the bearing member,
    wherein the shaft member is supported in a thrust direction by an inner bottom surface of the housing,
    wherein a charging amount of the lubricating oil into an internal space of the housing is adjusted so that, within a range of a use temperature, an oil level of the lubricating oil is positioned on another end side in the axial direction with respect to an end portion of the chamfered portion on one end side in the axial direction,
    wherein the bearing member integrally comprises:
        a small-diameter cylindrical portion, which is arranged on one end side in the axial direction, and has a relatively smaller outer diameter dimension; and
        a large-diameter cylindrical portion, which is arranged on another end side in the axial direction, and has a relatively larger outer diameter dimension,
    wherein an annular member is arranged between the small-diameter cylindrical portion and a tubular portion of the housing, and
    wherein the bearing member is fixed along the inner periphery of the housing by sandwiching the large-diameter cylindrical portion from both sides in the axial direction between the annular member and a bottom portion of the housing under a state in which an end surface of the small-diameter cylindrical portion on one end side in the axial direction is exposed to an atmosphere.

2. The fluid dynamic bearing device according to claim 1, wherein fitting of the large-diameter cylindrical portion with respect to the tubular portion of the housing and fitting of the small-diameter cylindrical portion with respect to the annular member each comprise loose fitting.

3. The fluid dynamic bearing device according to claim 1,
    wherein the bearing member is formed of a porous body made of sintered metal, and
    wherein the inner peripheral surface of the bearing member is molded in conformity with an outer peripheral surface of a sizing core.

4. The fluid dynamic bearing device according to claim 3, wherein a ratio (t2/t1) of a radial thickness (t2) of the large-diameter cylindrical portion to a radial thickness (t1) of the small-diameter cylindrical portion is less than 2.5.

5. The fluid dynamic bearing device according to claim 3, wherein a tapered surface which is gradually reduced in diameter from another end side in the axial direction toward one end side in the axial direction is formed in an outer peripheral surface of the small-diameter cylindrical portion.

6. The fluid dynamic bearing device according to claim 5,
    wherein a cylindrical surface having a constant diameter is formed on the outer peripheral surface of the small-diameter cylindrical portion, and
    wherein the cylindrical surface is formed between the tapered surface and an end surface of the small-diameter cylindrical portion on one end side in the axial direction.

7. The fluid dynamic bearing device according to claim 1, wherein a dynamic pressure generating portion configured to generate fluid dynamic pressure in the lubricating oil in the radial bearing gap is formed in the inner peripheral surface of the bearing member.

8. The fluid dynamic bearing device according to claim 1, wherein the shaft member is insertable and removable with respect to the bearing member.

9. The fluid dynamic bearing device according to claim 1, wherein an external force for urging the shaft member toward another end side in the axial direction is caused to act on the shaft member.

10. The fluid dynamic bearing device according to claim 1, wherein a rotor comprising vanes for moving air is provided to the shaft member.

11. A motor comprising the fluid dynamic bearing device according to claim 1.

* * * * *